United States Patent [19]

Alexander et al.

[11] Patent Number: 4,514,353
[45] Date of Patent: Apr. 30, 1985

[54] APPARATUS AND METHOD FOR FORMING A MULTI-COMPARTMENTED TRAY FROM A SHEET MATERIAL

[75] Inventors: Garold W. Alexander, Delaware; William H. Haase, Dublin, both of Ohio

[73] Assignee: International Paper Company, New York, N.Y.

[21] Appl. No.: 509,166

[22] Filed: Jun. 29, 1983

[51] Int. Cl.³ ............................................. B29C 17/00
[52] U.S. Cl. ..................................... 264/294; 264/320; 264/322; 264/324; 425/387.1; 425/388; 425/398
[58] Field of Search ............... 425/398, 387.1, 388; 264/320, 322, 324, 325, 292, 294; 72/350, 351

[56] References Cited

U.S. PATENT DOCUMENTS

| | | | |
|---|---|---|---|
| 2,348,871 | 5/1944 | Wiley | 18/19 |
| 2,354,564 | 7/1944 | Wiley | 18/45 |
| 2,434,375 | 1/1948 | Van Saun | 112/42 |
| 2,760,231 | 8/1956 | St. Clair | 425/398 X |
| 3,054,144 | 9/1962 | Goodwin et al. | 264/324 X |
| 3,580,041 | 5/1971 | Tilly et al. | 72/336 |
| 3,584,109 | 6/1971 | Meadors et al. | 264/292 |
| 3,768,950 | 10/1973 | Ihde | 425/398 |
| 3,932,575 | 1/1976 | Andersson | 264/154 |
| 3,983,827 | 10/1976 | Meadors | 113/121 C |
| 4,025,275 | 3/1977 | Gournelle | 425/198 X |
| 4,071,598 | 1/1978 | Meadors | 264/292 |
| 4,127,378 | 11/1978 | Meadors | 425/398 |
| 4,149,841 | 4/1979 | Patterson | 425/398 |
| 4,225,553 | 9/1980 | Hirota et al. | 425/398 |
| 4,228,121 | 10/1980 | Meadors | 264/291 |
| 4,246,223 | 1/1981 | Patterson | 264/324 X |
| 4,383,815 | 5/1983 | Kiefer et al. | 425/388 |

Primary Examiner—Jay H. Woo
Assistant Examiner—M. McGurk
Attorney, Agent, or Firm—Walt Thomas Zielinski; Robert J. Seman

[57] ABSTRACT

An apparatus and method are disclosed for forming a multi-compartmented tray from a sheet material without tearing or bowing. At least a portion of one compartment, and preferably the entire compartment, is formed in advance of other compartments. The apparatus for doing so comprises a preformer on the male die for forming the first compartment before the rest of the male die engages the workpiece.

13 Claims, 9 Drawing Figures

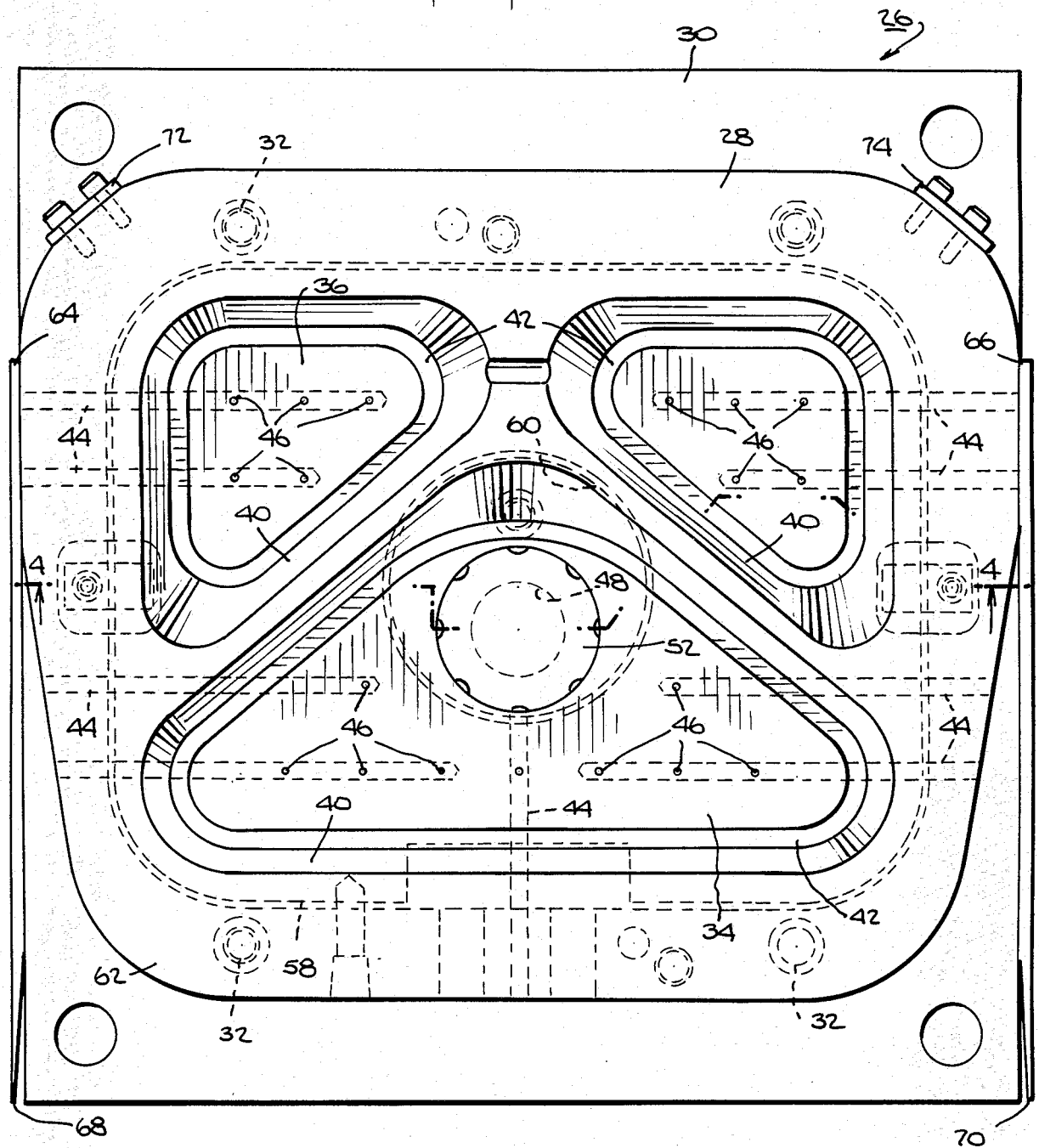

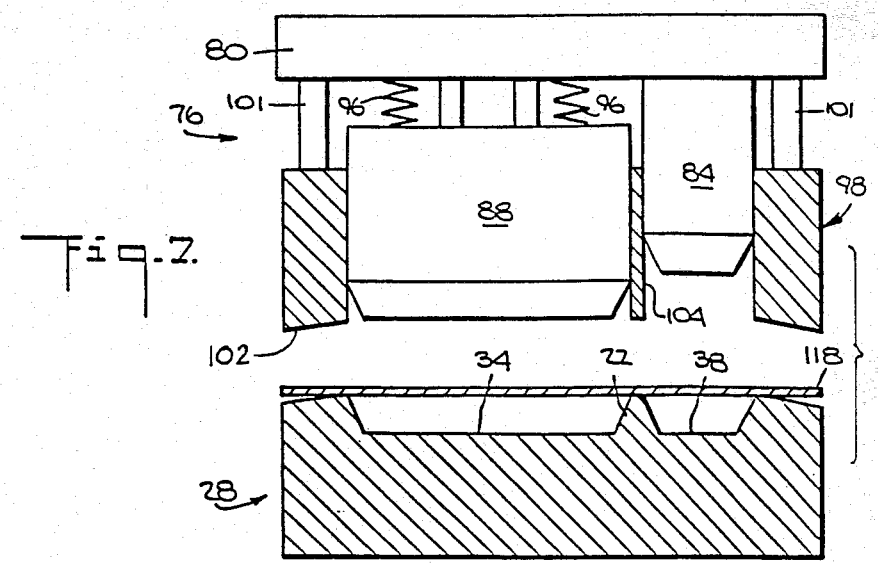
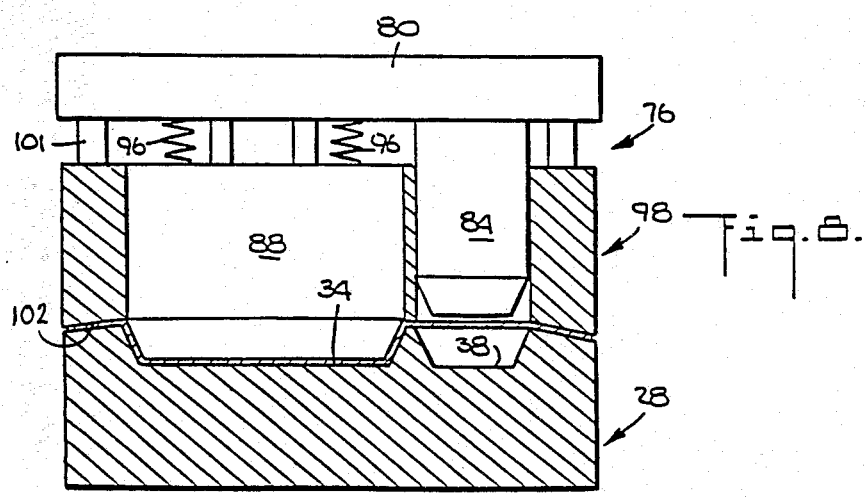
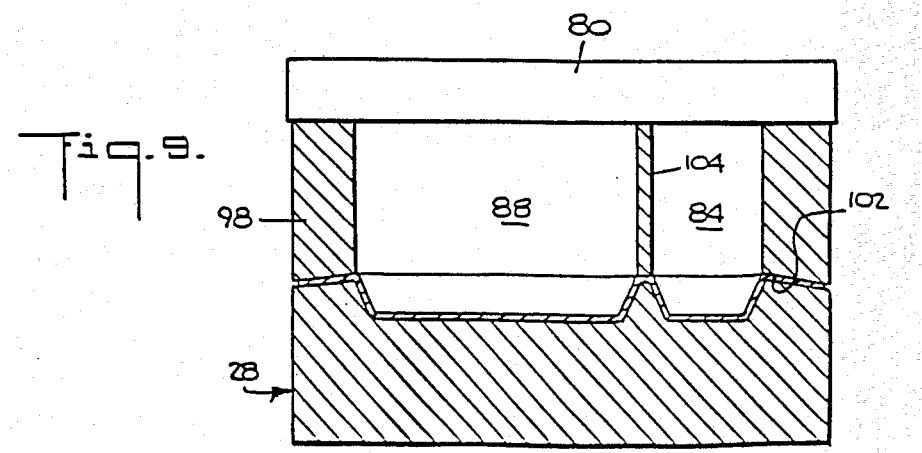

APPARATUS AND METHOD FOR FORMING A MULTI-COMPARTMENTED TRAY FROM A SHEET MATERIAL

BACKGROUND OF THE INVENTION

The technical field of the present invention is the formation of articles from sheet materials, and more particularly the formation of multi-compartmented trays from paperboard stock.

The formation of trays having several compartments separated by ribs whose height approaches that of the tray sidewall is an especially difficult problem. The stresses created in the rib regions during forming of the tray often cause the material to tear, tending to make the production of such trays unreliable and uneconomical. One early approach to the solution of the problem is disclosed in U.S. Pat. No. 2,760,231, issued to St. Clair. That patent discloses forming the tray in two stages, first forming the central portion of the tray, where the ribs are located, and then forming the sidewall.

Another approach is disclosed in U.S. Pat. Nos. 4,149,841 and 4,246,223, issued to Patterson. Patterson proposed preforming the central portion of each compartment of the tray and then completing the forming of the tray in a second step.

Despite the cited patents, however, no way has yet been disclosed to form deep trays, particularly those having ribs substantially as high as the sidewall, with an acceptably small rate of tearing and other defects.

In addition to tearing in the region of the ribs, known methods are prone to bowing (curvature of the tray bottom, especially in the vicinity of the rib separating the two smaller compartments in three-compartment trays), and to the presence of aesthetically unacceptable parting lines that occur when a compartment is formed in two stages.

It would be highly desirable to have a method of forming trays from paperboard and similar stock without the common problems of tearing, bowing and parting lines.

The principal object of the invention is therefore to provide an apparatus and a method for forming compartmented trays from sheet material, especially paperboard stock, free from the shortcomings of the prior art and capable of producing a high-quality product with a high degree of reliability and little wastage.

Another object of the invention is to provide such a method and apparatus capable of being used to form such trays having ribs substantially as high as the tray sidewalls.

SUMMARY OF THE INVENTION

The apparatus of the invention is a die set comprising a male and a generally complementary female die movable relative to each other between a spaced apart position and an abutting position. The male die includes a main die body and several compartment-formers, at least one of which is secured substantially immovably to the die body and at least one of which is disposed such that movement of the dies toward each other causes the latter compartment-former (the "preformer") to engage and form a compartment in a piece of material between the dies before the other compartment-former or compartment-formers engage the material. The preformer forms one compartment of the tray in a first forming step. Continued motion of the dies toward each other causes the remaining compartment-former or compartment-formers to engage the material and to form the other tray compartment or compartments.

The method of the invention comprises first forming one compartment of the tray, preferably the largest compartment, and then forming the remaining compartment or compartments. If the number of compartments is very large (i.e., many more than three), then the preforming step can include the simultaneous or sequential preformation of several compartments.

Other objects and features of the invention will be better understood from a consideration of the following detailed description of one preferred embodiment of the invention taken in conjunction with the accompanying drawings, wherein like reference characters refer to like elements throughout.

BRIEF DESCRIPTION OF THE FIGURES

FIG. 2 is a plan view of a female die according to the preferred embodiment of the invention.

FIGS. 7-9 are schematic cross-sectional views of the die set of FIGS. 2-5 before the piece of material is formed, while preforming one compartment of the tray and while completing the formation of the tray.

DESCRIPTION OF THE PREFERRED EMBODIMENT

Figure 1:
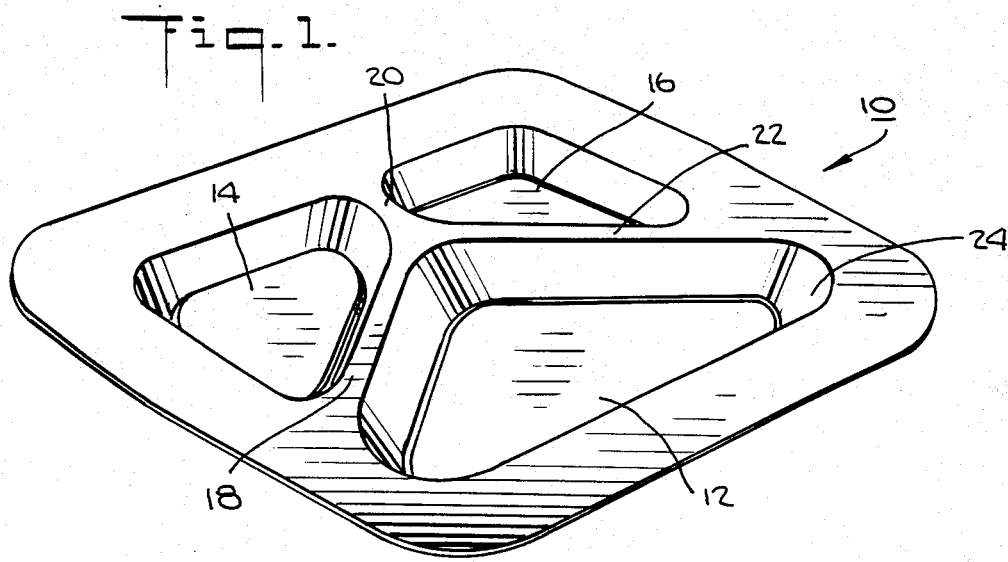
FIG. 1 is a perspective view of a three-compartment tray made by the method of the invention.

FIG. 1 shows a three-compartmented tray 10 that can be manufactured using the method and apparatus of the present invention. The tray 10 is formed integrally from a piece of sheet material such as paperboard stock. The three compartments 12, 14, 16 are separated by ribs 18, 20, 22 and surrounded by a sidewall 24. In the version shown, one compartment 12 is larger than the other two, which are equal in size, and the ribs 18, 20, 22 are substantially as high as the sidewall 24.

FIG. 2 shows the female die 26 of the die set according to the preferred embodiment of the invention. The female die 26 comprises a metal block 28 having a contour of the approximate shape of the tray to be formed, and mounted on a rectangular block 30 by means of bolts 32 or the like. The female die 26 has three approximately triangular depressions 34, 36, 38, which are for forming the three compartments 12, 14, 16 of the tray 10 of FIG. 1. Each depression has inwardly-sloping walls 40 that define the shape of the tray compartments. The perimeter 42 of the bottom of each depression is deeper than the central part of the depression, to provide peripheral gutters in the tray compartments.

Horizontal vent lines 44 in the female die body 28 communicate via small apertures or vertical bores 46 with the depressions 34, 36, 38 and serve to remove air from the depressions during the forming process.

The largest depression 34 has one corner overlying a central vertical bore 48 in which is slidably received a knock-out piston 50 having a disc-shaped flange 52 at its upper end. The flange 52 is normally received in a shallow well 54 in the upper surface of the depression 34. After a tray has been formed, the piston 50 is raised to eject the tray from the female die 26. The piston 50 is provided with a stop element 56 below the die body 28 to limit the upward travel of the piston 50 (see FIG. 3).

The body 28 of the die 26 contains a heater block 58, which has the shape of a rectangular prism with a cylindrical hole 60 in the middle to accommodate the knockout piston 50. The heater block 58 provides the heat required for the forming process.

The peripheral portion 62 of the female die 26 serves as a table against which the piece of material is clamped during forming.

The preferred embodiment shown is designed for use with blanks of material, although those skilled in the art will be able readily to modify it for use with a web. Two flat blades 64, 66 each have one end attached to the sides of the female die body 28, the free ends 68, 70 of the blades being slightly tapered and serving as guides to direct a blank into the correct position resting on the female die 26. To aid in this positioning, two vertical stop plates 72, 74 are secured to the rear edge of the female die 26.

Figure 3:
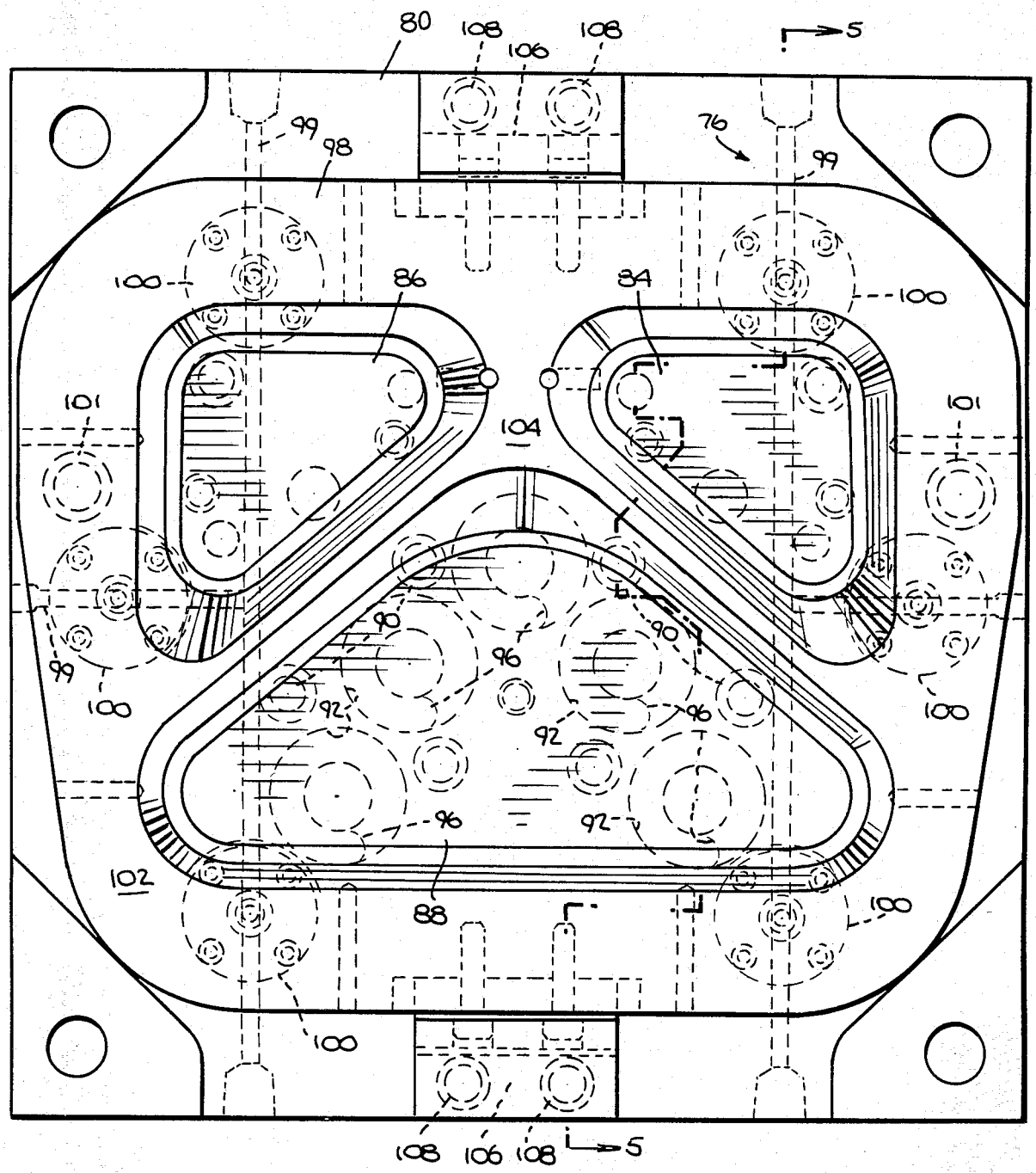
FIG. 3 is a plan view of a male die according to the preferred embodiment of the invention.
Figure 4:
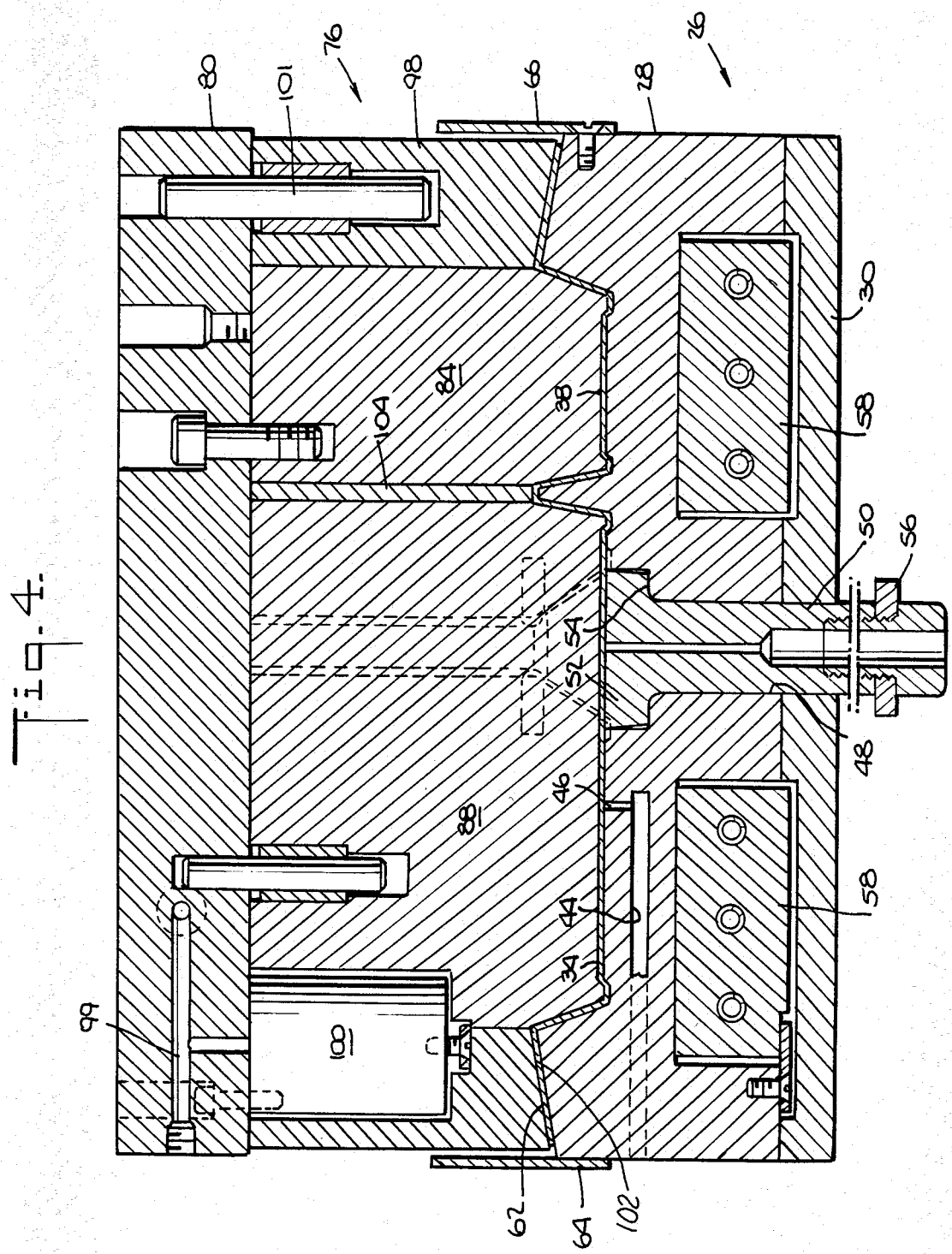
FIG. 4 is a cross-sectional view of the die set of the preferred embodiment as seen from section line 4—4 of FIG. 2.

FIG. 3 shows the male die 76 in plan view. It is mounted to suitable moving means (not shown) for vertical reciprocation relative to the female die.

Figure 5:
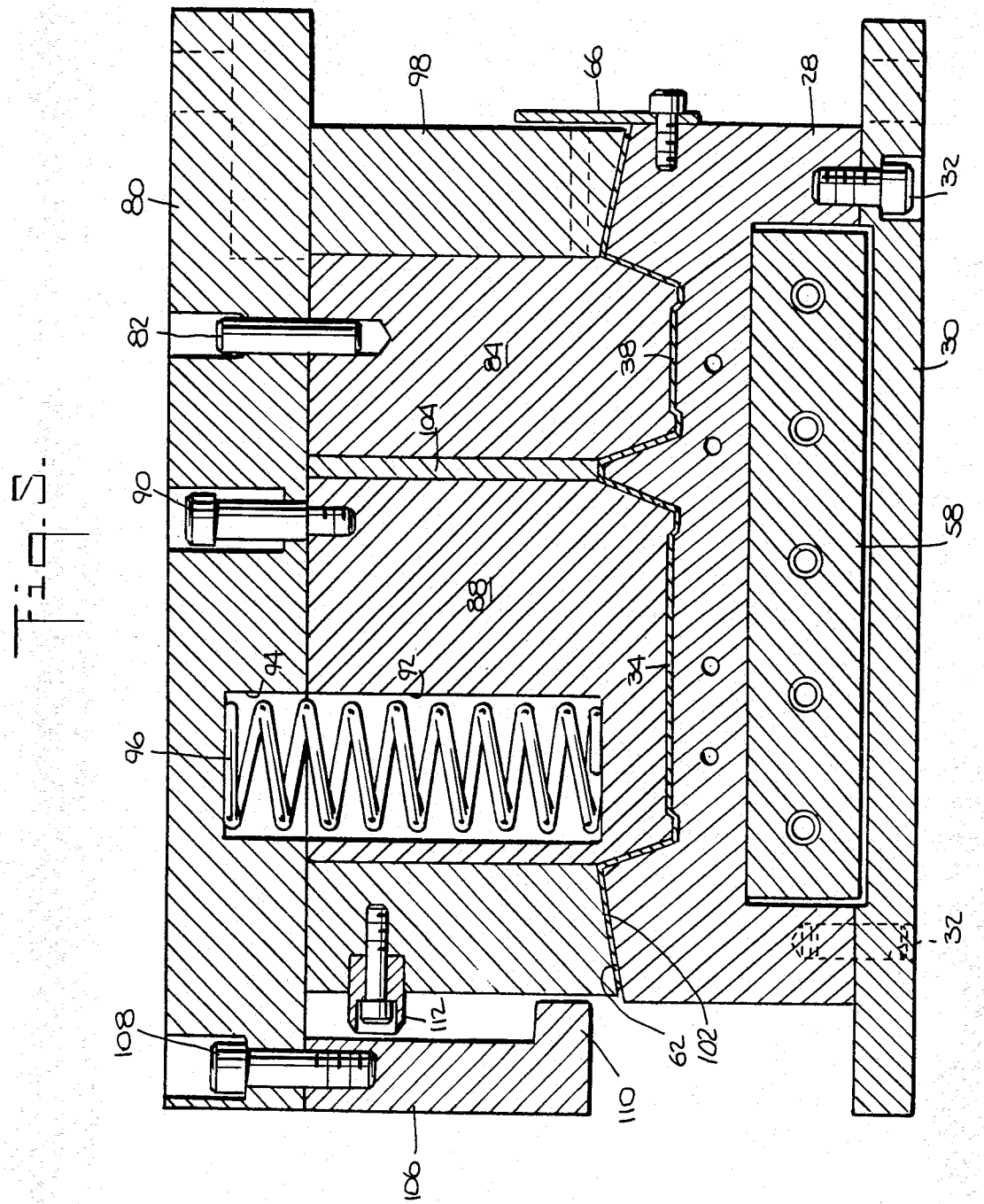
FIG. 5 is a cross-sectional view of the die set of FIG. 4 as seen from section line 5—5 of FIG. 3.

The male die 76 has a main body 80, which is essentially a horizontal plate in the version shown. Permanently secured to the main die body 80 by means of dowels 82 (see FIG. 5) are two compartment-formers 84, 86 whose lower ends are shaped to impart the desired form to the corresponding tray compartments. In the embodiment shown, formers 84, 86 are equal in size and form the two smaller compartments 14, 16 of the tray.

The former 88 for the largest compartment 12 is attached to the die body 80 by means of a plurality of shoulder bolts 90 having their heads received in vertical bores in the die body, allowing the main compartment former 88, or "preformer", to move vertically relative to the main body 80 of the die 76. Five cylindrical bores 92 are provided in the upper surface of the preformer 88, and additional bores 94 of the same diameter are located immediately overhead in the die body 80 (see FIG. 5). These bores 92, 94 house strong coil springs 96 (indicated schematically) whose function is to urge the preformer 88 toward the female die 26. The springs 96 are preloaded slightly to urge the preformer 88 downward from the male die body 80. As shown in FIG. 3, the five such springs 96 are arranged in the configuration of a "V" whose apex is near the corner of preformer 88 nearest to the center of die 76.

Also mounted on the underside of the main body 80 of the male die 76 is a draw ring 98 that serves to clamp the periphery of the piece of material during forming to control wrinkles. The draw ring 98 is urged downward from the die body 80 by means of six air cylinders 100 supplied by lines 99 and arranged in a hexagon and secured to both the die body 80 and the draw ring 98. Two dowel pins 101 and bushings guide the vertical movement of the draw ring 98 relative to die body 80.

Figure 6:
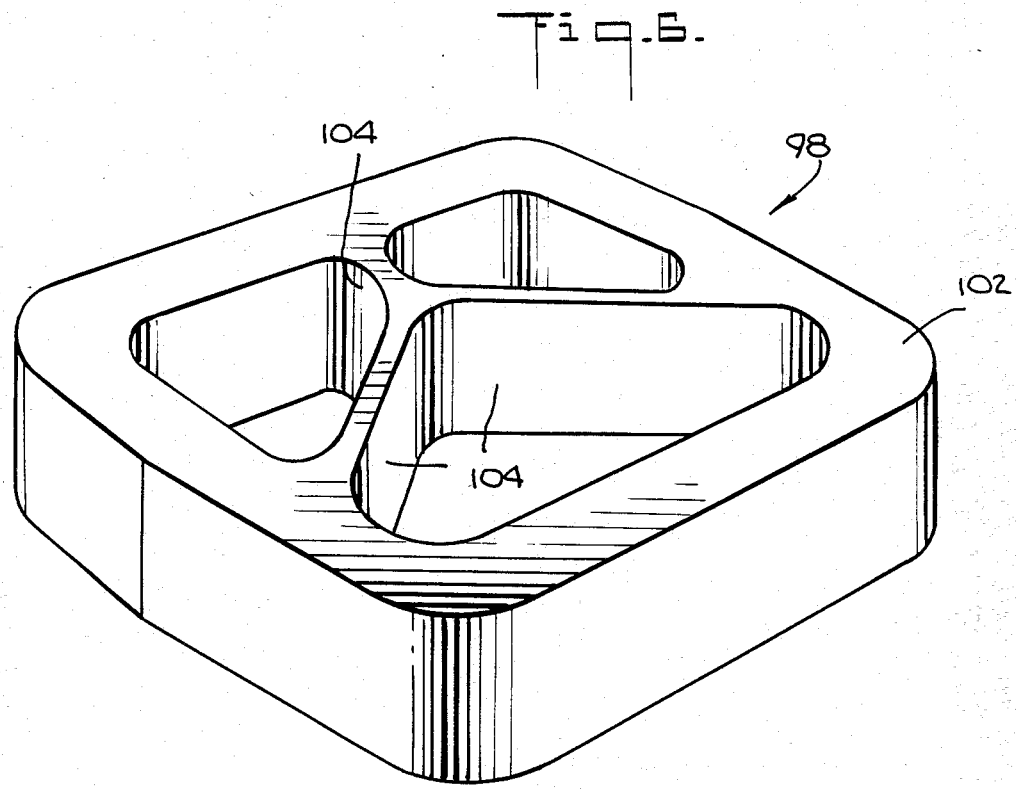
FIG. 6 is a perspective view of a draw ring used with the die set of FIGS. 1-5.

As shown in FIG. 6, the draw ring 98 has a perimetral outer part 102 that surrounds the preformer 88 and the other two compartment-formers 84, 86, and an inner portion 104 shaped to clamp the workpiece to the portions of the female die 26 that correspond to the ribs of the finished tray. This portion 104 of the draw ring 98 aids in controlling wrinkles and eliminating bowing.

Leg-shaped draw ring stop elements 106 are secured by bolts 108 to the underside of the main die body 80. An inwardly-extending flange 110 on each stop element 106 cooperates with a respective radially outward-extending stop pad 112 secured to the outer draw ring surface to limit the downward movement of the draw ring 98 (see FIG. 5).

In operation, as shown in FIGS. 7-9, a blank 118 is fed into position resting on the lower (female) die 26, as shown in FIG. 7. The male die 76 is then lowered by suitable conventional means (not shown). The weight of the preformer 88 and the preloading of the springs 96 cause the preformer 88 to depend from the main die body 80 at the full limit of the preformer's downward travel. The draw ring 98 is also at the lower limit of its travel at this state of the process, with the lower surfaces of the draw ring 98 and of the preformer 88 having the same relation as the corresponding surfaces of the finished tray will have.

The descent of the male die 76 causes the preformer 88 and the draw ring 98 to engage the blank 118 before the rest of the male die 76 does so. When the preformer 88 and, virtually simultaneously, the draw ring 98 contact the blank 118, the draw ring 98 clamps the periphery of the blank 118, while the preformer 88 forms the first tray compartment 12. Continued descent of the male die 76 completes the formation of the large compartment 12. This state is shown in FIG. 8.

Still further descent of the male die 76 causes the remaining two formers 84, 86 to contact the blank 118 and to form the other two tray compartments 14, 16, as shown in FIG. 9.

It has been found that use of the preforming method and apparatus of the invention limits the frequency of tearing in the region of the ribs to an acceptable level, even when forming trays having ribs equal in height to the tray sidewall. In addition, use of the draw ring to clamp the rib portions, as well as the periphery, of the workpiece has been found to eliminate bowing of the tray bottom and to aid in controlling wrinkling of the web much better than do conventional draw rings that contact only the periphery of the workpiece.

In the preferred embodiment shown, the female die is stationary, although the female die could instead be reciprocated, or if desired, both dies can be moved. Also, the male die can be placed above or below the female die.

To provide resistance to the vertical movement of the draw ring 98, brake pads or springs can be employed in place of air cylinders 100.

Although the invention has been described with reference to one preferred embodiment thereof, many variations and modifications thereof will now be apparent to those skilled in the art. Accordingly, the scope of the invention is to be limited, not by the details of the embodiment illustratively described herein, but only by the terms of the appended claims.

What is claimed is:

1. An apparatus for forming multi-compartmented trays from sheet material, said apparatus comprising: first and second dies movable relative to each other, between a first relative position in which they are spaced apart and a second relative position in which they fit together; means for moving said dies from said first relative position toward said second relative position for gripping a piece of material between said dies for forming such piece of material into a multi-compartmented tray; said first die including first and second compartment-formers for forming first and second spaced-apart compartments in such piece of material, said first and second compartment-formers being positioned such that the lower surface of said first compartment-former is spaced below an equivalent surface of said second compartment-former so that movement of said dies toward said second relative position causes said first compartment-former to form a first compartment in such piece of material to substantially the full intended depth of such first compartment before said second compartment-former forms a second compartment in such piece of material.

2. The apparatus of claim 1, wherein said first die further comprises a die body relative to which said first compartment-former is movable, and second moving means for moving said first compartment-former away from said die body and toward said second die.

3. The apparatus of claim 2, wherein said die body contains a recess in which said first compartment-former is movably received, said second moving means urging said first compartment-former toward said second die.

4. The apparatus of claim 2, wherein said second compartment-former is integral with said die body.

5. The apparatus of claim 1, wherein said dies are shaped to form trays whose compartments are separated by ribs substantially as high as the tray sidewall.

6. The apparatus of claim 1, wherein said dies are shaped to form three-compartment trays having one compartment larger than the others, said first compartment-former being for forming the largest compartment of each tray.

7. The apparatus of claim 1, wherein said first die further comprises compartment-expanding means for expanding a compartment formed by said first compartment-former, while said second compartment-former is forming a second compartment.

8. The apparatus of claim 1, further comprising a draw ring for retaining a piece of material for forming such piece of material into a tray.

9. The apparatus of claim 8, wherein said draw ring comprises an outer part for gripping a piece of material at the periphery of the portion of such piece of material that will become a tray, and an inner part shaped and disposed to grip the portions of such piece of material that will be formed into ribs of such tray.

10. The apparatus of claim 9, wherein said inner part is disposed among said compartment-formers and said moving means also is for decreasing the distance between said draw ring and said second die while moving said dies toward said second relative positon.

11. A method of forming a multi-compartmented tray from a piece of sheet material, comprising the steps of holding a piece of sheet material in place for forming it into a tray, forming to a substantially full depth a first compartment in said piece of material, and then forming at least one additional compartment in said piece of material spaced apart from said first compartment, while still holding said piece of material in place.

12. The method of claim 11, wherein said compartments are formed in such a manner as to be separated by ribs having a height substantially equal to the height of the tray sidewall.

13. The method of claim 11, wherein said first compartment is the largest compartment of said tray.

* * * * *